United States Patent
Northway, Jr. et al.

(10) Patent No.: US 10,708,294 B2
(45) Date of Patent: Jul. 7, 2020

(54) SYSTEM AND METHOD TO SELECT AND APPLY HYPOTHETICAL MITIGATION PARAMETERS

(71) Applicant: Arbor Networks, Inc., Burlington, MA (US)

(72) Inventors: William M. Northway, Jr., Ann Arbor, MI (US); Andrew D. Mortensen, Ann Arbor, MI (US); James E. Winquist, Ypsilanti, MI (US); Ronald G. Hay, Ann Arbor, MI (US); Nicholas Scott, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 227 days.

(21) Appl. No.: 15/409,892

(22) Filed: Jan. 19, 2017

(65) Prior Publication Data
US 2018/0205756 A1 Jul. 19, 2018

(51) Int. Cl.
*H04L 29/06* (2006.01)
*H04L 12/24* (2006.01)
*H04L 12/26* (2006.01)

(52) U.S. Cl.
CPC ...... *H04L 63/1441* (2013.01); *H04L 63/0227* (2013.01); *H04L 63/1416* (2013.01); *H04L 63/1425* (2013.01); *H04L 41/22* (2013.01); *H04L 43/045* (2013.01)

(58) Field of Classification Search
CPC ..... H04L 63/0209; H04L 63/02; H04L 63/14; H04L 63/1408; H04L 63/1416; H04L 63/1425; H04L 63/1433; H04L 63/1441; H04L 63/145; H04L 63/1458; H04L 41/06; H04L 41/22; H04L 43/045; H04L 43/062; H04L 63/0227
See application file for complete search history.

(56) References Cited

U.S. PATENT DOCUMENTS

| | | | |
|---|---|---|---|
| 7,752,665 B1* | 7/2010 | Robertson | H04L 63/1458 713/154 |
| 9,183,385 B2* | 11/2015 | Chapman, II | G06F 21/554 |
| 2003/0002436 A1* | 1/2003 | Anderson | H04L 43/00 370/218 |
| 2003/0145233 A1* | 7/2003 | Poletto | H04L 63/1408 726/22 |
| 2005/0289219 A1* | 12/2005 | Nazzal | H04L 63/1408 709/203 |

(Continued)

OTHER PUBLICATIONS

Tony Scheid, Consulting Engineer, Australia/New Zealand; "DDoS Detection and Mitigation Best Practices"; https://www.ts-x.eu/shared_public/ddos/arbor.pdf.

*Primary Examiner* — Kristine L Kincaid
*Assistant Examiner* — Alexander R Lapian
(74) *Attorney, Agent, or Firm* — Locke Lord LLP; Scott D. Wofsy; Christopher J. Capelli

(57) ABSTRACT

A system and method are provided to select mitigation parameters. The method includes receiving selection of at least one mitigation parameter, accessing a selected portion of stored network traffic or associated summaries that corresponds to a selectable time window, applying a mitigation to the selected portion of the stored network traffic or associated summaries using the selected at least one mitigation parameter, and outputting results of the applied mitigation.

6 Claims, 6 Drawing Sheets

(56) References Cited

U.S. PATENT DOCUMENTS

| | | | | |
|---|---|---|---|---|
| 2014/0181977 A1* | 6/2014 | Hammond | .......... | H04L 63/1458 |
| | | | | 726/23 |
| 2014/0380457 A1* | 12/2014 | Cassell | ............... | H04L 63/0236 |
| | | | | 726/13 |
| 2015/0215177 A1* | 7/2015 | Pietrowicz | ............ | H04L 43/106 |
| | | | | 370/230 |
| 2015/0304198 A1* | 10/2015 | Angelov | ............. | H04L 63/1425 |
| | | | | 726/11 |
| 2016/0173446 A1* | 6/2016 | Nantel | ................ | H04L 63/1425 |
| | | | | 726/11 |
| 2016/0218951 A1* | 7/2016 | Vasseur | ................... | H04L 43/12 |
| 2016/0226901 A1* | 8/2016 | Baikalov | ............. | H04L 63/1425 |
| 2016/0248644 A1* | 8/2016 | Dontcheva | ............ | H04L 43/045 |
| 2016/0352760 A1* | 12/2016 | Mrkos | ................. | H04L 63/1416 |
| 2017/0272465 A1* | 9/2017 | Steele | ................... | H04L 63/101 |

\* cited by examiner

SYSTEM AND METHOD TO SELECT AND APPLY HYPOTHETICAL MITIGATION PARAMETERS

FIELD OF THE INVENTION

The disclosed embodiments generally relate to computer network protection, and more particularly, to selection, application, and display of results related to application of hypothetical mitigation parameters during or after mitigation of a network attack.

BACKGROUND OF THE INVENTION

Networks are constantly exposed to security exploits that are of significant concern to network providers. For example, Denial of Service ("DoS") attacks can cause significant damage to networks and networked devices. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks).

Attack mitigation using mitigation parameters can be applied to thwart network security threats, pre-emptively or in reaction to a detected attack. However, when mitigation parameters are over aggressive, they can cause legitimate network traffic to be blocked. On the other hand, when such mitigation parameters are too lenient, security threats can be transmitted if portions of the network traffic are not mitigated that pose a security threat to the network. Since network security threats vary with time, mitigation parameters that are appropriate when first applied can eventually become over aggressive or too lenient.

Once one or more mitigation parameters are selected and applied, network security operators (NSOs) may be able to receive feedback on actual application of the mitigation parameters. An NSO may not realize that adjustment of mitigation parameters would be beneficial, until the NSO notices that too much, too little, or valid network traffic is actually being dropped, meaning risk of damage, or actual damage, has already been incurred. Even then, the NSO may use guess-work to adjust mitigations to apply. After some time, e.g., a few minutes, the NSO realizes that either an insufficient amount of traffic is being blocked in order to restore services or too much traffic is being blocked, after which the NSO may again adjust the mitigation parameters, which may be repeated until the NSO believes a proper balance has been reached.

Such conventional methods and systems have generally been considered satisfactory for their intended purpose. However, there is still a need in the art for providing an NSO with readily available and understandable information, including before an attack is detected or during a detected attack (e.g., in real time), about performance using alternative mitigation parameters relative to one another to reduce or minimize the risk of damage and guesswork involved in adjusting mitigation parameters. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to select hypothetical network traffic filters for application to recently captured or summarized network traffic. The method includes receiving selection of at least one mitigation parameter, accessing a selected portion of stored network traffic or associated summaries that corresponds to a selectable time window, applying a mitigation to the selected portion of the stored network traffic or associated summaries using the selected at least one mitigation parameter, and outputting results of the applied mitigation.

In accordance with another aspect of the disclosure, a system is provided to select hypothetical network traffic filters for application to recently captured or summarized network traffic, for example flow data records. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
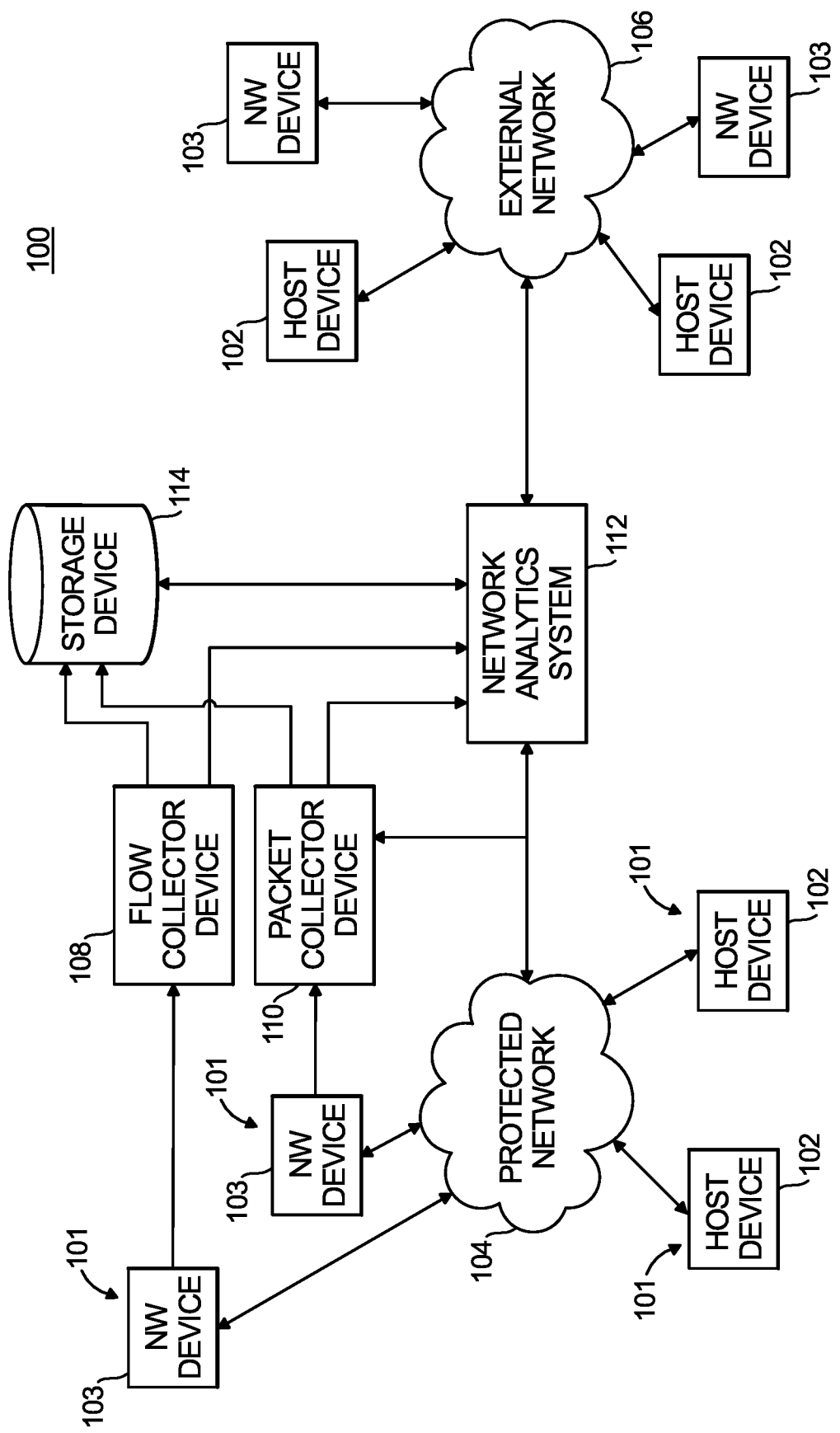
FIG. 1 illustrates a block diagram of an example network system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-5, as will be described.

With reference to FIGS. 1-5, a network analysis system is described that uses mitigation parameters for attack detection and countermeasures (e.g., filters) that are applied to stored network traffic or associated summaries. Resulting effects of using the mitigation parameters can be presented graphically to the network security operator (NSO). Graphical visualizations of applied mitigations that use different mitigation parameters can be displayed to the NSO for comparison to one another and comparison to mitigation parameters actually used. The graphic displays can enable the NSO to readily grasp the impact of the different mitigation parameters, and/or to make rapid decisions regarding mitigation parameter adjustments.

Furthermore, the GUI can provide interactive display elements that allow the NSO to select a time window that defines which historical network traffic the mitigation is applied to using the hypothetical mitigation parameters. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an", and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes a plurality of devices 101, including host devices 102 and network devices 103, which are coupled to a protected network 104 and an external network 106. The host devices 102 can communicate with other how devices 102 that are coupled to the same network or a different network via at least one of the protected network 104 and the external network 106. The respective protected network 104 and the external network 106 can be, for example, a network such as the Internet, a private network, a different public network, a cellular network, a personal communication service (PCS) network, a public switched telephone network (PSTN), a wireless network, etc.

The devices 101 can communicate with the network 104 and/or another device 101 via one or more communication links. These communication links can be wireless, wired, or a combination thereof. The host devices 102 can include, for example, mobile computing devices, smart phones, servers, media servers, stationary computing devices, printers or multi-functions devices, sensors, etc. The network devices 103 can include, for example, routers, switches, hubs, and bridges that are used to communicatively couple host devices 102 to one another. The protected network 104 can include a plurality of network devices 103.

The network devices 103 can sample certain characteristics of the traffic flowing through them, summarizing the data into sets of records, known as flow records, which represent full traffic flows. Flow records are summarized descriptions of the traffic between two network endpoints for a brief period of time. These flow records can be received by one or more flow collector devices 108, which can save the flow records, e.g., for an arbitrary period of time. Some commercially available implementations of flow records include NetFlow, IPFIX and sFlow®.

Packet intercept devices (not shown) that can be distributed in the protected network 104, such as disposed along communication links or included with network devices 103, can intercept and/or make copies of packets of the network traffic. The packet intercept devices can be passive or active and include software, firmware, and/or hardware components, such as taps, probes, or port mirrors that can be positioned inline along communication links between any of host and network devices 102, 103, integrated with network devices 103. In embodiments, the packet intercept devices can include software modules, which can include software agents, or can be virtual devices that are remote relative to host and network devices 102, 103 and the communication links.

The packets and or packet summaries intercepted by the packet intercept devices can be collected by one or more packet collector devices 110. The flow collector device 108 and the packet collector device 110 can provide flow records and packet summaries to a storage device 114 and/or to a network analytics system 112.

The network analysis system 112 analyzes the flow records and/or the packet summaries to mitigate network attacks by detecting the attacks and applying countermeasures to block unwanted traffic. The network analysis system 112 accesses the network data, flow records, and/or packet summaries stored in any of the flow collector device 108, packet collector device 110, and storage device 114, which can include reading, copying, retrieving, receiving a transmission with or without requesting the transmission, or otherwise obtaining.

The network analysis system 112 is in a path of the network traffic and therefore can also capture and/or summarize packets or flows of the network traffic. The network analytics system can mitigate attacks using mitigation parameters. The mitigation parameters include attack detection parameters and countermeasure parameters. For example, the network analytics system 112 can passively monitor for attacks by monitoring, using attack detection parameters, the network traffic that flows through it and/or packet summaries and/or flow records that it receives from the flow collector device 108, packet collector device 110, and storage device 114. When an attack is detected based on the attack parameters, or at a requested time, the network analytics system applies countermeasures using the countermeasure parameters to block attack traffic.

Summarization of packets can be performed by one or more of the packet-intercept devices and the packet collector device 110. Summarization of traffic flows can be performed by one or more of the network devices 103 and the flow collector device 108. The packet collector device 110 and the flow collector device 108 include hardware, firmware, and/or software components. One or more of any of the packet intercept devices, the network devices 103, the flow collector device 108, the packet collector device 110, and the network analytics system 112 can be integrated together in one or more devices.

Because the flow records contain key details of traffic flowing over the network, collected flow records can characterize the overall use of a network and/or detect and identify attack patterns, while requiring less storage and redundancy but much of the insight offered by full traffic captures.

The network analytics system 112 monitors traffic directed to (inbound) or from (outbound) the protected network 104, and can detect an indication of an attack, such as when volume of network traffic exceeds a selected threshold. In an example scenario, an attack can emanate from one or more attacking host devices 102 that are coupled to the external network 106, and be directed at a computing device 102 that is using the protected network 104. These attacking host devices 102 can work independently from one another or be coordinated, such as in a botnet. For example, one or more of the attacking computer devices 102 can be zombies. The attacks can target specific or random attacked host devices 102. An attacked host device 102 using the protected network 104 can be converted into an attacking host device. Such an attacking host device can continue to operate legitimately and transmit both attack traffic and legitimate traffic.

The attack can involve a variety of unwanted network behavior, such as denial-of-service attacks; distributed denial of service ("DDoS") attacks; TCP SYN floods, in which the attackers send repeated requests to create a new connection to a target until the target's ability to create legitimate connections is inhibited or overwhelmed; and application state exhaustion attacks, in which attackers establish and maintain idle sessions with a service until the service cannot respond to valid requests.

Figure 2:
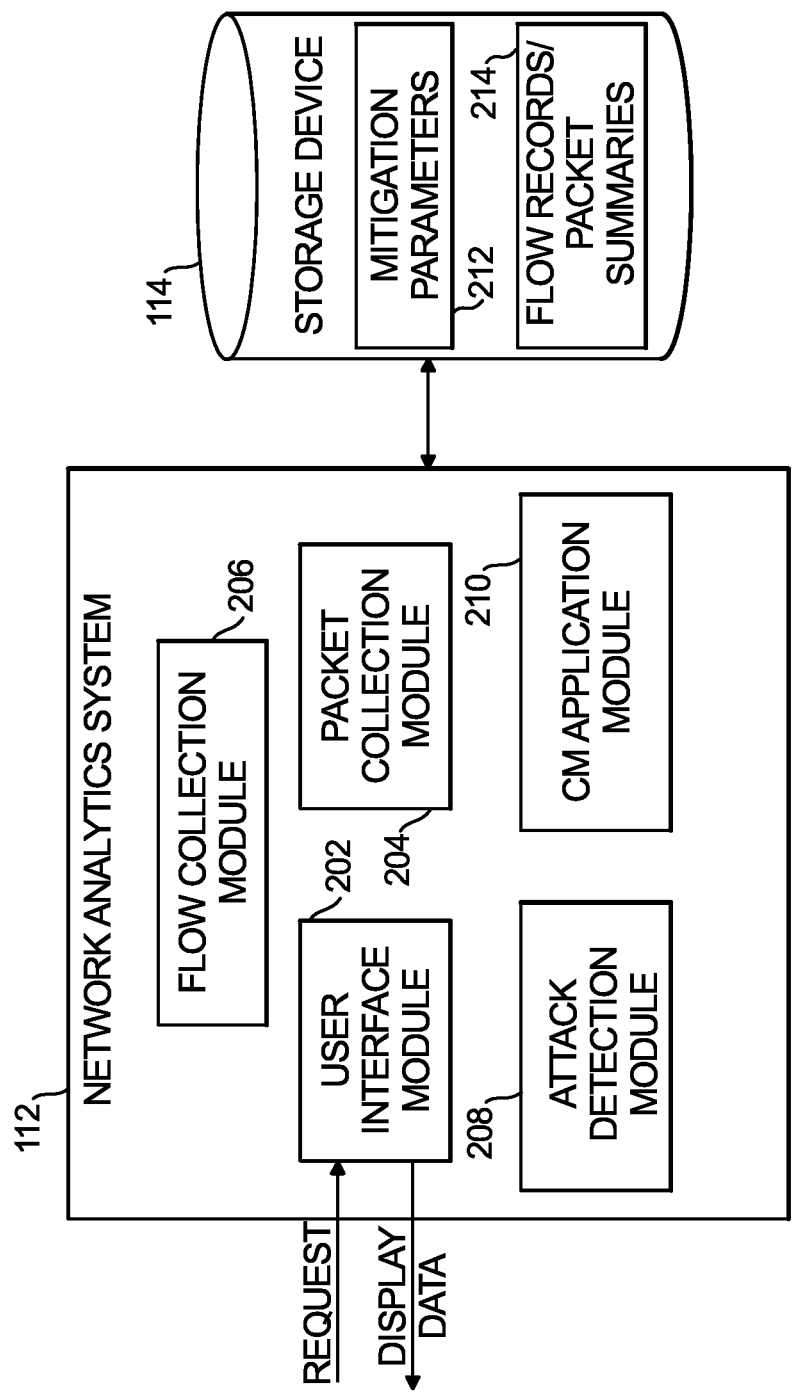
FIG. 2 illustrates a block diagram of a threat management system of the network system shown in FIG. 1 in data communication with a storage device, in accordance with an illustrative embodiment of the present disclosure.

With reference to FIG. 2, an example embodiment of the network analytics system 112 is shown. The network analytics system 112 mitigates attacks by detecting attacks and applying countermeasures when an attack is detected. The network analytics system 112 includes a user interface module 202, a packet collection module 204, a flow collection module 206, an attack detection module 208, and a countermeasure (CM) application module 210. In addition, the network analytics system 112 can include one or more firewalls or intrusion detection/protection systems (IDS/IPS).

The attack detection module 208 analyzes captured traffic to or from the network 104, or summarized packets or flows received by the packet collection module 204 and/or flow collection module 206. Based on an alert detection analysis, that applies alert detection parameters, the alert detection module 208 can generate an alert that an attack that has been detected.

When an attack is detected, the CM application module can apply countermeasures to traffic flowing in either direction. Such countermeasures can include identifying attack traffic versus legitimate traffic, blocking identified attack traffic, applying traffic filters that drop traffic with specific characteristics, forwarding identified legitimate traffic, and/or blacklisting one or more source IP addresses associated with the attack. Blocked attack traffic is not output from the network analytics system 112 as network traffic for transmission to its intended destination. When the IP source address is blacklisted, future traffic from the same source IP address will be blocked. Forwarded legitimate traffic is output from the network analytics system 112 as network traffic for transmission to its intended destination.

The user interface module 202, packet collection module 204, flow collection module 206, attack detection module 208, and CM application module 210 can each be independent devices that are coupled to one another, integrated in one or more devices in any combination, or share one or more hardware or software components. Additionally, the network analytics system 112, including any of its individual modules, can be implemented as physical or virtual devices. Whether implemented as a physical or virtual device, the network analytics system 112 or its modules use a hardware processing device that executes software instructions, which enables performance of the disclosed functions.

The network analytics system 112 includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also store program data associated with operation of the network analytics system 112.

In embodiments, at least portions of the network analytics system 112 are external to the protected network 104. In embodiments, at least portions of the network analytics system 112 are located within internal to the protected network 104. At least portions of the network analytics system 112 can be located at a network edge (inside or outside of the protected network 104) and/or deeper within the protected network 104.

The network analytics system 112 can access the storage device 114. The storage device 114 stores mitigation parameters 212 and flow records/packet summaries 214. The mitigation parameters 212 include, for example, attack identification parameters and countermeasure parameters. The attack identification parameters can include, for example, traffic rate or traffic volume thresholds, and the countermeasure parameters can include, for example, filter definitions.

The network analytics system 112 can receive requests to apply mitigation using one or more mitigation parameters to the actual network traffic in real time, or to stored network traffic or associated summaries. The request can specify the mitigation parameters to use. Additionally, the request can specify a time window that defines a time interval having a beginning and end time.

When a time window is not specified in the request, mitigation is applied to actual network traffic in real time using the mitigation parameters specified. When a time window is specified in the request, mitigation using the mitigation parameters is applied to historical data stored with the flow records/packet summaries 214 that has a time stamp which is included in the time window.

The time window specified in a request can define the time interval from a specified begin time to the present time. In such a scenario, the mitigation parameters are applied to recent network traffic up to present time, for a look-back period determined by the beginning time of the associated time interval.

The mitigation parameters 212 include, for example, attack identification parameters and countermeasure parameters. The attack identification parameters can include, for example, threshold values, such as thresholds for selected traffic characteristics, such as traffic rate or traffic volume, to use for detecting an attack. The countermeasure parameters can include, for example, filter definitions to use for applying countermeasures to thwart attack traffic and minimizing a negative impact on legitimate network traffic.

The attack detection module 208 can compare threshold values indicated by the attack identification parameters to selected network traffic characteristics, which can also be indicated by the attack parameters. When the threshold values are exceeded such that an attack is detected, the attack detection module 208 can generate an alert and notify the CM application module 210 that an attack has been detected. The alert can notify the NSO, such as by generating an alert delivered via a GUI, an SMS text, a pager, and/or an email.

The CM application module 210 applies countermeasures using the countermeasure parameters. The countermeasures can be applied in response to receipt of notification of a detected attack from the attack detection module 208 or on a continual basis without notification. The countermeasures applied can use for example, filters defined by filter definitions included in the countermeasure parameters. A filter can include, for example, a blacklist or whitelist. In embodiments the filter can filter based on traffic characteristics specified by the filter definition.

The captured or summarized network traffic, including any amount of flow records, captured packets, packet summaries stored as flow records/packet summaries 214 or streamed in real time, include details about traffic characteristics, such as source and destination addresses and/or ports, transmission control protocol (TCP) flags, service port numbers, and network application header labels. A countermeasure's filter can use a filter definition that is based on traffic characteristics to filter the stored network traffic or associated summaries included in the time window or streamed traffic in real time. Traffic is blocked that matches the characteristics specified by the filter using a filter definition included in mitigation parameters selected by the NSO.

The requests, which can include mitigation parameters and/or a selected time window, can be received by the user interface module 202 from another processing device, another software module, or an NSO who entered the request via a user input device. User interface module 202 can include one or more interfaces that communicate with the user input device (e.g., a touchscreen, keyboard, cursor control device (e.g., mouse), etc.) and/or a user output device (e.g., display screen (e.g., the touchscreen), printer). The user interface module 202 can generate a graphical user interface (GUI) that includes interactive display elements that a user can operate via the user input device for entering requests.

In addition, the user interface 202 can provide results of application of the mitigation using actual and/or hypothetical mitigation parameters to a user output device or to the requesting processing device. The user output device can include, for example, a display device or a printer. The user interface module 202 can provide a GUI that can be displayed on the user output device. The user interface module 202 can generate a single GUI that can both receive user requests or other user input, and display results of mitigation application to the user.

Thus, results of applying the mitigation using the hypothetical mitigation parameters to stored network traffic or associated summaries as well as results of applying the mitigation using actual mitigation parameters to actual network traffic can be displayed. The displayed information can be graphically displayed via a GUI, which an NSO can view to compare results of using the actual and the hypothetical mitigation parameters. Results of application of different mitigations can be displayed in different display areas of a display device or sequentially. Using the displayed information, the NSO can make rapid decisions, such as to select a hypothetical mitigation parameter to replace the actual mitigation parameters being used based on its performance as indicated by the displayed results.

In embodiments, the time window selection is used to retrieve data from the flow records/packet summaries 214 stored in the storage device 114. In embodiments, the storage device 114 can include a user interface via which the time window selections can be entered.

In embodiments, data can be collected in the flow records/packet summaries 214 on an ongoing basis, and retrieved in response to a request based on the time window specified. In embodiments, data is collected in response to a request. In response to the request, the attack detection module 208 and/or the CM application module 210 access data stored in the flow records/packet summaries 214 based on the traffic window specified. When additional time windows are requested, the attack detection module 208 and/or the CM application module 210 access data stored in the flow records/packet summaries 214 based on the largest time window requested.

The time window selections can be based on the NSO's preference and the situational context. For example, a default time window can include the most recent 5 minutes. The NSO can select longer time windows to provide additional context and/or understanding of the present situation. The NSO can make use of the ability to change the duration of the time window, such as to view if an attack is increasing, decreasing, constituted a single spike, or indications that the attack has changed tactics due to the mitigation being applied.

The GUI can provide the user with interactive display elements with selectable choices of mitigation types, mitigation parameters (including threshold values, network traffic characteristic being measured and compared to the threshold, and filter definitions to use), and time window. The interactive display elements can include, for example, menus (e.g., static, drop-down or pop-up), user operable arrows that increase or decrease a displayed value, etc.

Figure 3A:
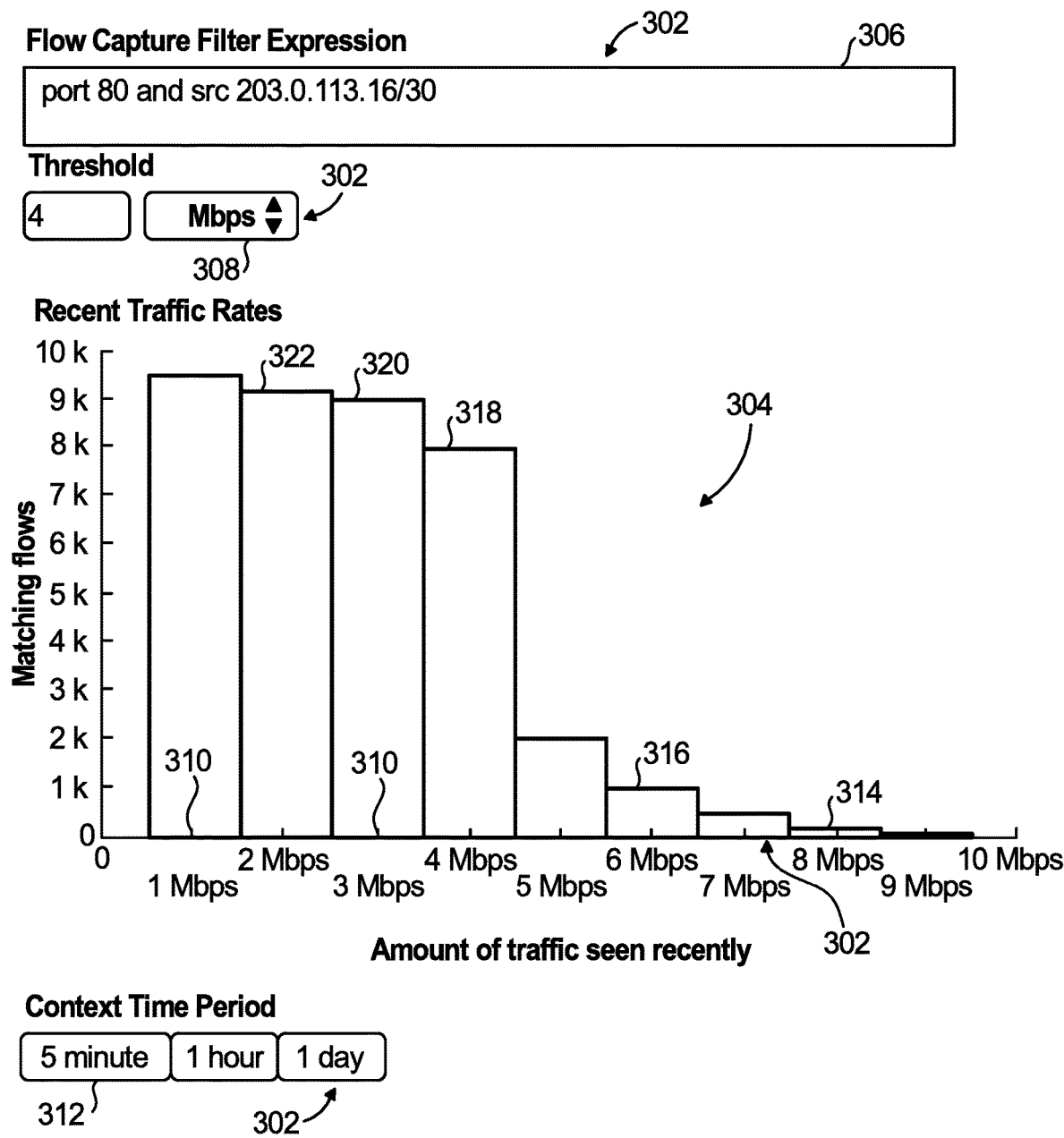
FIG. 3A illustrates screen shot of a displayed graph showing results of application of hypothetical mitigation parameters, in accordance with an illustrative embodiment of the present disclosure.

With reference now to FIG. 3A, an example GUI displayed to a user is shown. The GUI includes a graph 300 that shows a plot 304 of results of an example application of hypothetical alert detection and countermeasure parameters, and interactive display elements 302 that can be operated by a user for entering user selections for applying hypothetical mitigation parameters to stored flow records/packet summaries. Entries selected by the user using the interactive display elements 302 can be submitted to the network analytics system 112 via the user interface module 202 as requests.

Graph 300 shows a number of flows which were determined to match a filter using a selected filter definition in order to determine the selection of a traffic threshold (also referred to as traffic amounts seen recently). The filter definition selected is the countermeasure parameter used and the selected traffic thresholds are the attack detection parameters being used during application of the mitigation.

The number of flows determined to match the filter applied is indicated along the vertical axis, and observed traffic values (0-10 Mbps) are indicated along the horizontal axis. Graph 300 includes plotted results at discrete traffic threshold values, wherein traffic volumes which were found within specific ranges were tallied in a bin and those total values are displayed. The results (number of flows determined to match the filter pattern) between each of the discrete traffic threshold values were obtained in response to an NSO request requesting application of a filter using the selected filter definition between various discrete traffic thresholds.

In the example shown, several requests for measurement of traffic volume were submitted for application at respective traffic thresholds. Additionally, the request specifies a selected time window, wherein the selected results are requested for stored network traffic or associated summaries (e.g., packets or flow or packet summaries) that have time stamps included within the selected time window. In the example shown, the selected time window includes a five minute time interval that ends at the present time.

Once the results are displayed as a graph, the NSO can visualize the most significant drop-off point at which the plot has the steepest slope. In this example, the most significant drop-off point is between 4-5 Mbps. The NSO can use the most significant drop-off point to make an educated decision for selecting mitigation parameters to apply to actual network traffic.

While the example in FIG. 3A shows a particular type of plot, results in response to a request can be shown using other forms of data visualization. The mitigation parameter selections can include countermeasure parameter selections, such as a filter definition for a filter to be applied; attack detection parameter selections, such as threshold traffic rate values to be applied; and/or a time window selection for selecting stored network traffic or associated summaries. If a selection is not included in the request, default values can be used. The data visualization can help inform the NSO about recent or historical network activity related to the selected mitigation parameters.

The mitigation parameters are selected by the user using interactive display elements 302. In the example the user interactive display elements includes a first display element 306 for selecting a filter definition, a second display element 308 for selecting a threshold value, a third display element 310 for selecting a traffic threshold value, and a fourth display element 312 for selecting a time window.

Regarding the first display element 306, the NSO can enter, by typing in or selecting from a list (e.g., via a dropdown menu), an identification of a filter definition that applies a particular filter pattern. The NSO can compare plots that result from different filter definition selections, such as by comparing the plots sequentially, or at the same time, such as overlaid on a single graph or in respective windows of the GUI.

Regarding the second display element 308, the NSO can enter, e.g., by typing or operating up/down arrows, an interactive slider, or other user interface inputs, an attack detection threshold value, such as a traffic amount, at which point the countermeasures, such as a filter using the selected filter definition is applied. The NSO can compare results from different threshold selections on the same plot 300, as shown, or in different plots, e.g., displayed sequentially or at the same time, such as overlaid on a single graph or in respective windows of the GUI.

Regarding third display elements 310, the horizontal axis can include third display elements 310 located at selected points along the horizontal axis. For example, activating one of the third display elements 310 by clicking on it selects a point that corresponds to the second display element 308. In embodiments, the entire horizontal axis can be a display element such that any point along the horizontal axis can be selected.

Regarding the fourth display element 312, the NSO can enter, by typing in or selecting from available selections, a context time window that specifies which stored data, e.g., network traffic or associated summaries stored in storage device 114 shown in FIGS. 1 and 2, to which the filter using the selected filter definition and the attack detection using the selected threshold value are applied at the selected data points along the horizontal axis. In the example shown, the time window specifies a five minute look-back period from the present time. In embodiments, a start and end time can be specified for the time window. The NSO can compare plots that result from different time window selections, such as by comparing the plots sequentially, or at the same time, such as overlaid on a single graph or in respective windows of the GUI.

Graph 300 shows that at point 314 of plot 304, at a traffic threshold of 8 Mbps, approximately 0.5 k flows of attack network traffic matched a pattern established by the filter definition; at point 316, at a traffic threshold of 6 Mbps, approximately 1.0 k flows of attack network traffic matched the pattern established by the filter definition, which shows that the amount of packets that matched the filter pattern increased by about 100%. Graph 300 further shows that at point 318 of plot 304, at a traffic threshold of 4 Mbps, approximately 8.0 k flows of attack network traffic matched the pattern established by the filter definition, which shows that the amount of packets which could have been blocked increased by about 700%. Graph 300 further shows that at points 320 and 322 of plot 304, at a traffic threshold of 3 Mbps and 2 Mbps, respectively, the amount of flows of attack network traffic that matched the pattern established by the filter definition increased by a negligible amount.

The NSO may conclude that the small improvement in blocked network traffic achieved at these settings may not be worth the risk of blocking legitimate traffic, and that the traffic threshold of 4 Mbps is the most effective setting. The NSO can continue the process to fine tune the settings.

An NSO that did not have the advantage of gaining knowledge by viewing graph 300 might have adjusted the traffic threshold from the traffic threshold value that corresponds to point 314 to the traffic threshold value that corresponds to point 316. The NSO may have appreciated the large improvement gained by this adjustment. However, the NSO would be blind to the potential improvement that could be achieved by further adjusting the traffic threshold to the traffic threshold value that corresponds to point 318. Thus, graph 300 illustrates effectiveness of viewing network traffic behavior associated with applying hypothetical mitigation parameters to historical network traffic, which can include recent network traffic, to aid in selecting the most mitigation parameters to be applied during mitigation of actual network traffic.

Figure 3B:
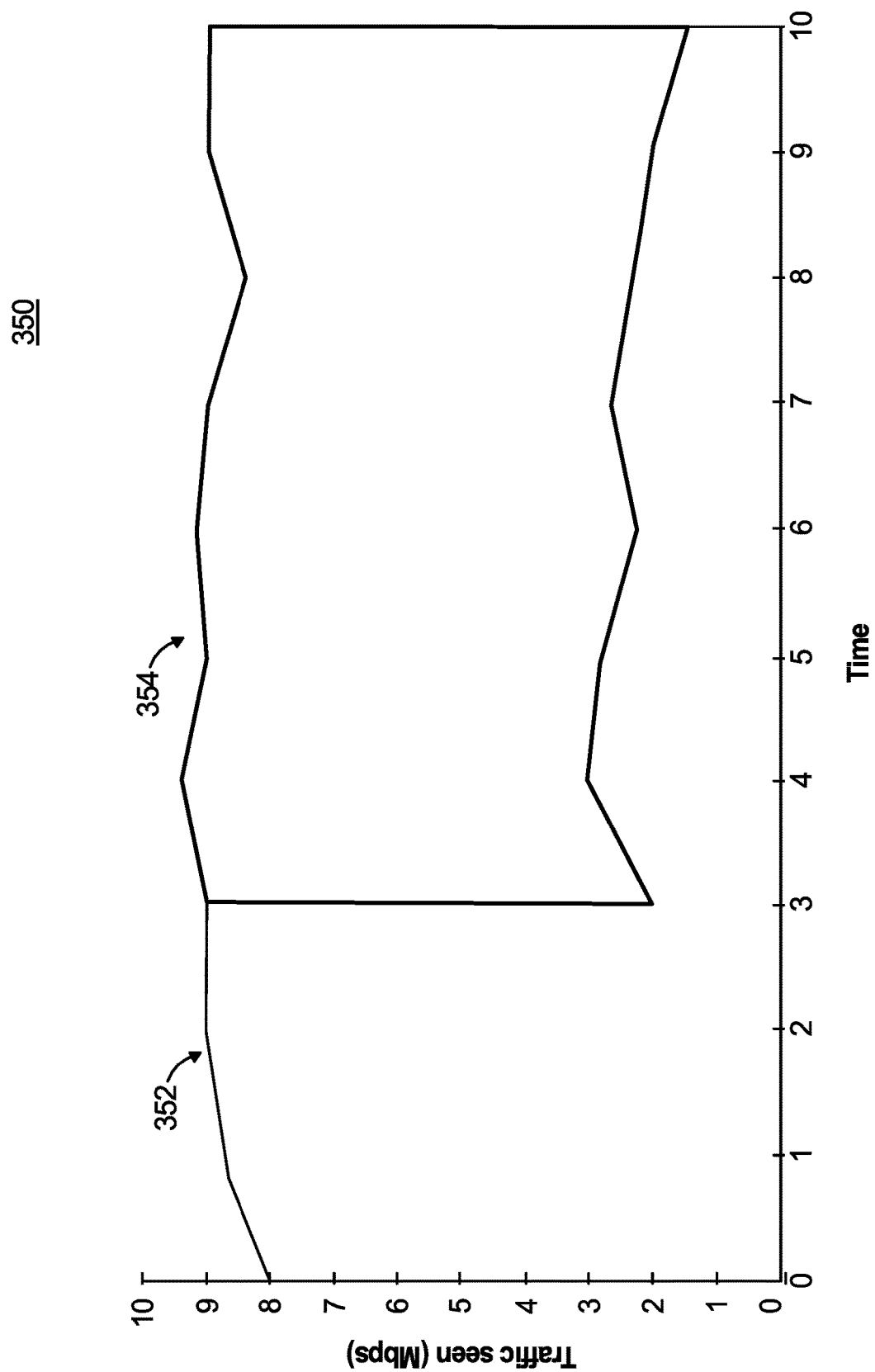
FIG. 3B illustrates a screen shot of a displayed graph showing traffic measurements before and after applying selected hypothetical mitigation parameters.

With reference to FIG. 3B, an example GUI displayed to a user is shown. The GUI includes a graph 350 that shows a first plot 352 and a second plot 354 that indicate an amount of traffic seen (MBPS), which is represented along the vertical axis, over time, wherein time is represented along the horizontal axis. The GUI shown in FIG. 3B can also include interactive display elements 302 for selecting hypothetical mitigation parameters and a time window to apply. The first plot 352 represents traffic seen over time before a countermeasure using selected countermeasure parameters was applied, and the second plot 354 represents traffic seen over time after the countermeasure using the selected countermeasure parameters was applied. First plot 352 indicates that before the countermeasure was applied, all traffic was passed. Second plot 354 indicates that after the countermeasure was applied at time=3, approximately 75% of the traffic was dropped.

Figure 4:
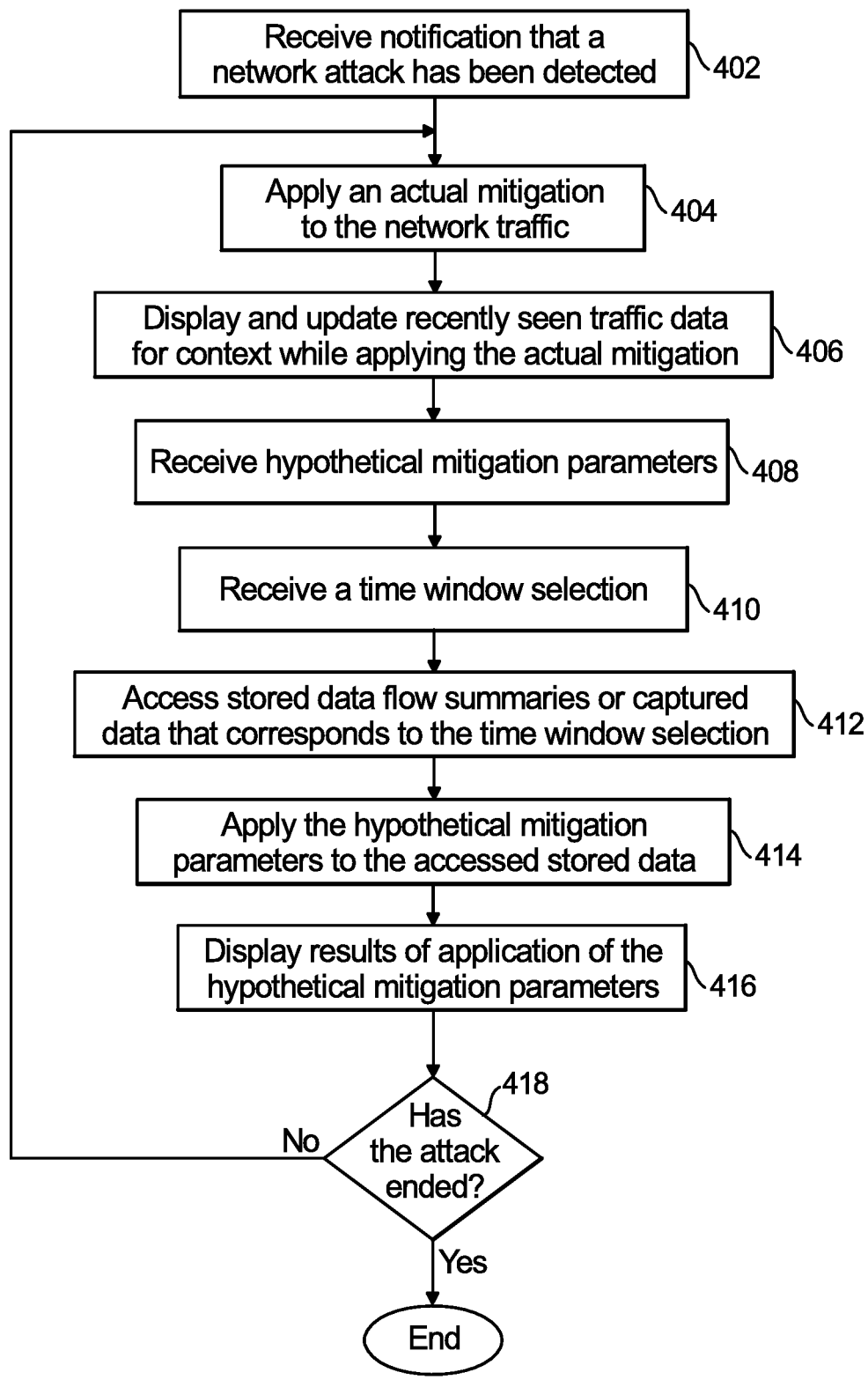
FIG. 4 illustrates a flowchart of an example method for applying a mitigation using hypothetical mitigation parameters to stored network traffic or associated summaries in accordance with an illustrative embodiment of the present disclosure.

With reference now to FIG. 4, shown is a flowchart demonstrating implementation of the various exemplary embodiments. It is noted that the order of operations shown in FIG. 4 is not required, so in principle, the various operations may be performed out of the illustrated order or in parallel. Also certain operations may be skipped, different operations may be added or substituted, or selected operations or groups of operations may be performed in a separate application following the embodiments described herein.

At operation 402, notification is received that a network attack has been detected. The notification can be included in a GUI displayed to an NSO, such as on a display screen, an audible tone, or another form of notification. The attack can be detected by an attack detection module, such as the attack detection module 208 of the network analytics system 112 shown in FIG. 2.

At operation 404, a first mitigation is optionally applied to the actual network traffic in real time. The first mitigation uses initial selected or default mitigation parameters (including attack detection parameters and/or countermeasure parameters).

At operation 406, results of application of the first mitigation on recent network traffic are displayed in a first display area of a display device that is viewable by the NSO. The displayed results provide context to the NSO for selecting hypothetical mitigation parameters.

At operation 408, hypothetical mitigation parameters selected by the NSO are received. These hypothetical mitigation parameters are entered by the NSO via a user interface device that communicates with a user interface module of the mitigation system, such as user interface module 202 of mitigation system 112. The hypothetical mitigation parameters can include a selection of attack detection parameters, such as a traffic rate threshold value, and countermeasure parameters, such as a filter definition to be used when applying a filter. At operation 410, a time window selection is received. The time window selection can be received via the user interface module. The initial hypothetical mitigation parameters and the initial time window can be selected by the NSO or default values can be used.

At operation 412, stored flow or packet summaries or captured data that corresponds to the time window selection are accessed. The term "access," as used herein refers to copying, reading, receiving, retrieving, or otherwise obtaining. At operation 414, a second mitigation is applied to the accessed stored data using the hypothetical mitigation parameters.

At operation 416, results of application of the second mitigation using the hypothetical mitigation parameters are displayed. The NSO can compare results of application of the first mitigation to results of application of the second mitigation. The NSO can select adjust the mitigation parameters applied in the first mitigation using knowledge gained from the results of application of the first and second mitigations. The NSO can further configure additional mitigations using different hypothetical mitigation parameters and/or different time windows.

At operation 418, a determination is made whether the attack has ended. If so, the method ends. If not, the method continues at operation 404 in which the application and display of the applied first and second mitigations. As the method continues iteratively, updated hypothetical mitigation parameters used for application of the second or additional mitigations can be received from the NSO, as well updates to the mitigation parameters used for application of the first mitigation. Results of application of each of the mitigations are displayed. Operations 404-418 can be repeated until the attack ends.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the threat management system shown in FIG. 1 may be implemented or executed by one or more computer systems. For example, the network analytics system 112 can be implemented using a computer system such as example computer system 502 illustrated in FIG. 5. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system executable instructions, such as program modules, being executed by a computer system. Generally, program modules may include routines, programs, objects, components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Figure 5:
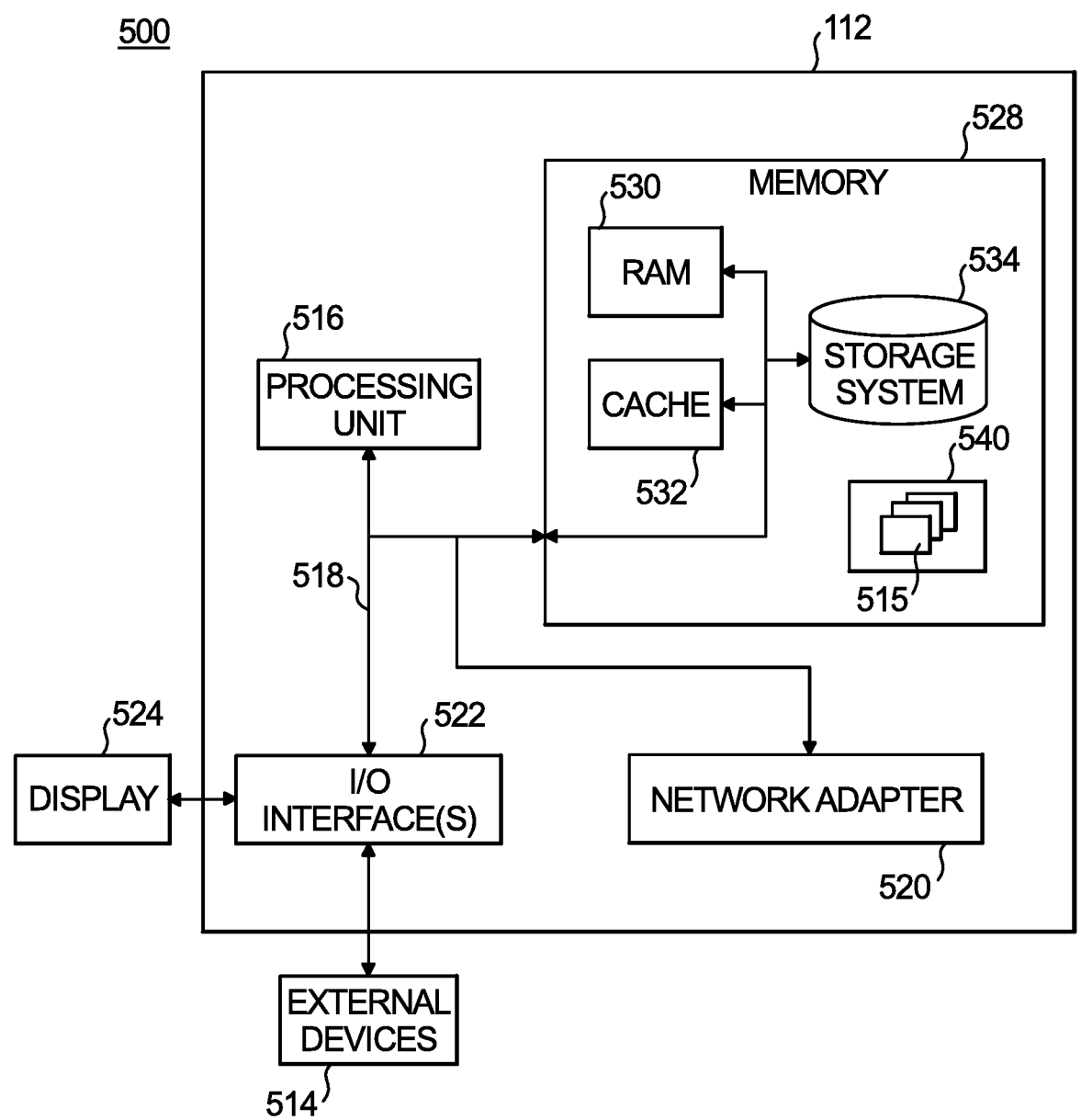
FIG. 5 illustrates a schematic block diagram of an example network computing device that implements the threat management system shown in FIG. 2, in accordance with an illustrative embodiment of the present disclosure.

Computer system 502 is shown in FIG. 5 in the form of a general-purpose computing device. The components of computer system 502 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 502 typically includes a variety of computer system readable media. Such media may be any available media that is accessible by network analytics system 112, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as computer system 502, may be stored in memory 528 by way of example, and not limitation, as well as an operating system, one or more application programs, other program modules, and program data. Each of the operating system, one or more application programs, other program modules, and program data or some combination thereof; may include an implementation of a networking environment. Program modules 515 generally carry out the functions and/or methodologies of embodiments of the disclosure as described herein.

Computer system 502 may also communicate with one or more external devices 514 such as a keyboard, a pointing device, a display 524, etc.; one or more devices that enable a user to interact with computer system 502; and/or any devices (e.g., network card, modem, etc.) that enable the network analytics system 112 to communicate with one or more other computing devices. Such communication can occur via Input; Output (I/O) interfaces 522. Still yet, computer system 502 can communicate with one or more networks such as a local area network (LAN), a general wide area network (WAN), and/or a public network (e.g., the Internet) via network adapter 520. As depicted, network adapter 520 communicates with the other components of n 100 via bus 518. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the network analytics system 112 include providing NSOs visual feedback for results of application of mitigation using selectable mitigation parameters to stored flow records or packet summaries and/or real time network traffic. The visual feedback associated with application of mitigation to network traffic using different mitigation parameters to stored flow records or packet summaries can be compared and used to adjust the mitigation parameters. The visual feedback can be used to make adjustments to mitigation parameters used when applying mitigation to actual network traffic in real time as actual conditions change, allowing the NSO to respond to emerging traffic patterns.

The displayed results of the applied mitigations provide "what if" feedback that the NSO can use to consider the effects of a variety of mitigation parameters before deploying an adjustment to mitigation parameters used during application of a mitigation to actual network traffic in real time. The NSO can tune the mitigation parameters based on knowledge, as opposed to guesswork. The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A system to select mitigation parameters, the system comprising:
   at least one packet intercept device coupled to a communication link in a computer network configured to make copies of packets of network traffic traversing in the computer network;
   a flow collector device coupled to the at least one packet intercept device configured to generate flows records associated with received network traffic packets captured by the at least one packet intercept device;
   a packet collector device coupled to the at least one packet intercept device configured to generate packet summaries associated with received network traffic packets captured by the at least one packet intercept device; and
   a network analytics system coupled to each of the flow collector device and the packet collector device, including:
      a memory configured to store instructions;
      a processor disposed in communication with the memory, wherein the processor upon execution of the instructions is configured to:
         provide a graphical user interface (GUI) that provides a plurality of interactive display elements that a user operates to select at least the following mitigation parameters: 1) a filter definition for a filter to be applied; 2) an attack traffic threshold value; 3) a flow traffic threshold value; and 4) a time window;
         define first user selected mitigation parameters for mitigation application whereby a user through interaction with the GUI selects each of 1) a filter definition for a filter to be applied; 2) an attack traffic threshold value; 3) a flow traffic threshold value; and 4) a time window;
         access a selected portion of stored network traffic for application of the first user selected mitigation parameters utilizing the generated flow records and packet summaries that corresponds to the user selected time window;
         apply the first user selected mitigation parameters to the selected portion of the stored network traffic; and
         output results of the applied first user selected mitigation parameters on the selected portion of the stored network traffic to be displayed on the GUI.

2. The system of claim 1, wherein the processor, upon execution of the instructions, is further configured to:
   apply second user selected mitigation parameters to actual network traffic in real time; and
   output results of the applied second user selected mitigation parameters via the GUI for comparison to displayed results of the applied first user selected mitigation parameters.

3. The system of claim 1, wherein defining user selected mitigation parameters includes receiving second user selected mitigation parameters that is different than the first user selected mitigation parameters, wherein the processor, upon execution of the instructions, is further configured to:
   apply the second user selected mitigation parameters to the selected portion, or a different portion, of the stored network traffic; and
   process, for display, output results of application of the mitigation and the second mitigation.

4. The system of claim 1, wherein the processor, upon execution of the instructions, is further configured to receive at least two time window selections, wherein:
   accessing the selected portion of stored network traffic includes accessing a selected portion of the stored network traffic that applies to each of the time window selections, and
   applying the first user selected mitigation parameters to the selected portion of the stored network traffic includes applying the first user selected mitigation parameters to each selected portion of the stored network traffic that corresponds to the respective at least two time window selections.

5. The system of claim 1, wherein the stored network traffic includes at least one of flow summaries, packet summaries, and captured data packets.

6. The system of claim 1, wherein the processor is further configured to:
   receive hypothetical mitigation parameters;
   receive actual mitigation parameters;
   apply each of the received hypothetical and actual mitigation parameters to the stored network traffic such that the output results of the applied mitigation displays resulting network traffic from application of the hypothetical mitigation parameters superimposed with application of the actual mitigation parameters.

* * * * *